US009071377B2

(12) United States Patent
Effenberger et al.

(10) Patent No.: US 9,071,377 B2
(45) Date of Patent: *Jun. 30, 2015

(54) UPGRADED BANDWIDTH MAP FOR TEN GIGABIT PASSIVE OPTICAL NETWORK

(71) Applicant: Futurewei Technologies, Inc., Plano, TX (US)

(72) Inventors: Frank J. Effenberger, Colts Neck, NJ (US); Yuanqiu Luo, Cranbury, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 60 days.

This patent is subject to a terminal disclaimer.

(21) Appl. No.: 13/925,740

(22) Filed: Jun. 24, 2013

(65) Prior Publication Data
US 2013/0287399 A1 Oct. 31, 2013

Related U.S. Application Data

(63) Continuation of application No. 12/708,978, filed on Feb. 19, 2010, now Pat. No. 8,472,801.

(60) Provisional application No. 61/155,221, filed on Feb. 25, 2009.

(51) Int. Cl.
*H04J 3/16* (2006.01)
*H04Q 11/00* (2006.01)

(52) U.S. Cl.
CPC ....... *H04J 3/1694* (2013.01); *H04J 2203/0067* (2013.01); *H04Q 11/0067* (2013.01); *H04Q 2011/0064* (2013.01)

(58) Field of Classification Search
CPC .................. H04Q 11/0067; H04Q 2011/0064
USPC ................................. 398/58, 66–67
See application file for complete search history.

(56) References Cited

U.S. PATENT DOCUMENTS 7,031,343 B1 4/2006 Kuo et al.
7,301,968 B2 11/2007 Haran et al.
(Continued)

FOREIGN PATENT DOCUMENTS

CN 101068159 A 11/2007
CN 101330450 A 12/2008
(Continued)

OTHER PUBLICATIONS

"Series G: Transmission Systems and Media, Digital Systems and Networks, Digital Sections and Digital Line System—Optical Line Systems for Local and Access Networks, Gigabit-Capable Passive Optical Networks (G-PON) Transmission Convergence Layer Specification," ITU-T Recommendation G. 984.3, Feb. 2004, 116 pages.

(Continued)

*Primary Examiner* — Dzung Tran
(74) *Attorney, Agent, or Firm* — Conley Rose, P.C.; Grant Rodolph; Jonathan K. Polk (57) ABSTRACT

An apparatus comprising an optical line terminal (OLT) configured to transmit a bandwidth map (BWmap) for a plurality of burst signals to be transmitted by a plurality of optical network units (ONUs), wherein the BWmap comprises a plurality of allocations, and wherein each allocation comprises a start time for the allocation, a grant size for the allocation, and a header error correction (HEC) for the allocation.

18 Claims, 6 Drawing Sheets

(56) References Cited

U.S. PATENT DOCUMENTS

| | | | |
|---|---|---|---|
| 7,889,990 | B2 | 2/2011 | Kazawa et al. |
| 8,335,431 | B2 * | 12/2012 | Effenberger et al. ............ 398/67 |
| 2003/0133460 | A1 | 7/2003 | Lee et al. |
| 2007/0248109 | A1 | 10/2007 | DeCarolis et al. |
| 2007/0274719 | A1 * | 11/2007 | Ferguson et al. ............... 398/66 |
| 2008/0260385 | A1 | 10/2008 | Eguchi |
| 2008/0273881 | A1 | 11/2008 | Fujimura |
| 2009/0154916 | A1 * | 6/2009 | Huang et al. ....................... 398/1 |
| 2009/0162065 | A1 | 6/2009 | Mizutani et al. |
| 2010/0215369 | A1 | 8/2010 | Effenberger et al. |
| 2012/0045200 | A1 | 2/2012 | Effenberger et al. |

FOREIGN PATENT DOCUMENTS

| | | |
|---|---|---|
| JP | 2003244178 | 8/2003 |
| JP | 2007312375 | 11/2007 |
| JP | 2008160658 | 7/2008 |
| JP | 2008167482 | 7/2008 |
| JP | 2008283323 | 11/2008 |
| WO | 0245308 A1 | 6/2002 |

OTHER PUBLICATIONS

"Series G: Transmission Systems and Media, Digital Systems and Networks, Digital Sections and Digital Line System—Optical line Systems for Local and Access Networks, Gigabit-Capable Passive Optical Networks (G-PON): Transmission Convergence Layer Specification," ITU-T Recommendation G. 984.3, Mar. 2008, 146 pages.
Foreign Communication From a Related Counterpart Application, PCT Application PCT/CN2010/070750, International Search Report dated May 27, 2010, 3 pages.
Foreign Communication From a Related Counterpart Application, PCT Application PCT/CN2010/070750, Written Opinion dated May 27, 2010, 7 pages.
Foreign Communication From a Related Counterpart Application, Japanese Application No. 2011515081, Japanese Office Action dated Jun. 12, 2012, 5 pages.
Foreign Communication From a Related Counterpart Application, Japanese Application No. 2011515081, Partial Translation of Japanese Office Action dated Jun. 6, 2012, 4 pages.
Foreign Communication From a Related Counterpart Application, European Application No. 10745830.9, Extended European Search Report dated Sep. 24, 2012, 9 pages.
Foreign Communication From a Related Counterpart Application, Chinese Application No. 201080001655.0, Chinese Office Action dated Aug. 28, 2012, 5 pages.
Foreign Communication From a Related Counterpart Application, Chinese Application No. 201080001655.0, English Translation of Chinese Office Action dated Aug. 28, 2012, 3 pages.
Foreign Communication From a Related Counterpart Application, Australian Application No. 2010217076, Australian Office Action dated Nov. 19, 2012, 4 pages.
Pre-Interview Communication dated Aug. 13, 2012, 13 pages, U.S. Appl. No. 12/708,978, filed Feb. 19, 2010.
Office Action dated Sep. 17, 2012, 15 pages, U.S. Appl. No. 12/708,978, filed Feb. 19, 2010.
Office Action dated Dec. 14, 2012, 13 pages, U.S. Appl. No. 12/708,978, filed Feb. 19, 2010.
Notice of Allowance dated Mar. 4, 2013, 9 pages, U.S. Appl. No. 12/708,978, filed Feb. 19, 2010.
Office Action dated Dec. 2, 2011, 16 pages, U.S. Appl. No. 13/283,781, filed Oct. 28, 2011.
Notice of Allowance dated Mar. 29, 2012, U.S. Appl. No. 13/283,781, filed Oct. 28, 2011, 7 pages.
Notice of Allowance dated Oct. 9, 2012, U.S. Appl. No. 13/283,781, filed Oct. 28, 2011, 14 pages.
"Series G: Transmission Systems and Media, Digital Systems and Networks, Digital Section and Digital Line System—Optical Line Systems for Local and Access Networks, 10-Gigabit-Capable Passive Optical Networks (XG-PON): Transmission Convergence (TC) Layer Specification," ITU-T, Telecommunication Standardization Sector of ITU, G.987.3, Oct. 2010, 134 pages.
Foreign Communication From a Counterpart Application, European Application No. 10745830.9, European Office Action dated Aug. 29, 2013, 7 pages.

* cited by examiner

UPGRADED BANDWIDTH MAP FOR TEN GIGABIT PASSIVE OPTICAL NETWORK

CROSS-REFERENCE TO RELATED APPLICATIONS

This application is a continuation of U.S. patent application Ser. No. 12/708,978 filed Feb. 19, 2010 by Frank J. Effenberger, et al., and titled "Upgraded Bandwidth Map for Ten Gigabit Passive Optical Network," which claims priority to U.S. Provisional Patent Application No. 61/155,221 filed Feb. 25, 2009 by Frank J. Effenberger, et al., and titled "Upgraded Bandwidth Map for Ten Gigabit Passive Optical Network," both of which are incorporated by reference in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point-to-multi-point (P2MP) network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 Gigabits per second (Gbps) while upstream data is transmitted at about 1.25 Gbps. The bandwidth capabilities of the PON systems are expected to increase as the demands for services increase. To meet the increased demand in services, the OLT logic devices need to be reconfigured to transmit the data frames at a higher bandwidth, for example at about 10 Gbps. In addition, the ONU logic devices need to be reconfigured to process the received data at a higher bandwidth, which can be computationally expensive for some processes, such as forward error correction (FEC). One aspect that can affect the computation in FEC and the level of errors in communications is the configuration of the bandwidth map (BWmap).

SUMMARY

In one embodiment, the disclosure includes an apparatus comprising an OLT configured to transmit a BWmap for a plurality of burst signals to be transmitted by a plurality of ONUs, wherein the BWmap comprises a plurality of allocations, and wherein each allocation comprises a start time for the allocation, a grant size for the allocation, and a header error correction (HEC) for the allocation.

In another embodiment, the disclosure includes an apparatus comprising at least one component configured to implement a method comprising receiving a BWmap for a plurality of burst signals, wherein the BWmap comprises a plurality of start times, a plurality of lengths corresponding to the start times, and a plurality of burst profiles corresponding to the start times, obtaining at least one allocated start time from the start times and the corresponding length, calculating a transmission length based on the allocated length, calculating a stop time based on the allocated start time and the calculated transmission length, and configuring the burst profile of the associated upstream burst.

In yet another embodiment, the disclosure includes a method comprising receiving a BWmap comprising a plurality of allocations that each comprise a start time, a grant size, and a burst profile, configuring a burst signal using the corresponding burst profile, and transmitting a burst signal within at least one of the allocations.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Reconfiguring the PON system's logic to support higher transmission rates or more ONUs may include modifications to existing protocols, such as a GPON protocol defined by the International Telecommunication Union (ITU) Standardization Sector (ITU-T) G.984.3 standard, which is incorporated herein by reference. According to the GPON protocol, an OLT may be configured to transmit downstream frames comprising a BWmap. The BWmap may comprise a plurality of allocations, which may comprise a start time and a stop time. The allocation may indicate the timing for a plurality of burst signals to be transmitted by the ONUs. The ONUs may calculate a payload length for each of the burst signals using the start time and the stop time in the corresponding allocations. The calculation may include the inverse of a non-linear function that produces the transmission length for FEC, and possibly other calculations that may be time consuming and resource intensive. For example, the non-linear function may be a ceiling function, which may be difficult to solve when FEC is used.

Disclosed herein is a system and method for configuring the BWmap to improve FEC calculation, reduce computation time, and/or reduce communication errors in the PON system. The BWmap may comprise a plurality of allocations that may comprise a start time and a length but no stop time. The length may indicate the payload length of the corresponding allocation, e.g. before FEC and line coding. The BWmap may also comprise a plurality of flags and a HEC, which may be used for error detection and error correction. The ONU may use the length in the allocation to calculate a stop time which may be obtained directly from the allocation instead of calculating an inverse of a non-linear function for the FC transmission length. Additionally, the ONU may be configured to verify whether an allocation is lost, and accordingly pad the lost allocation for FEC, before transmitting a burst signal within at least one of the allocations.

Figure 1:
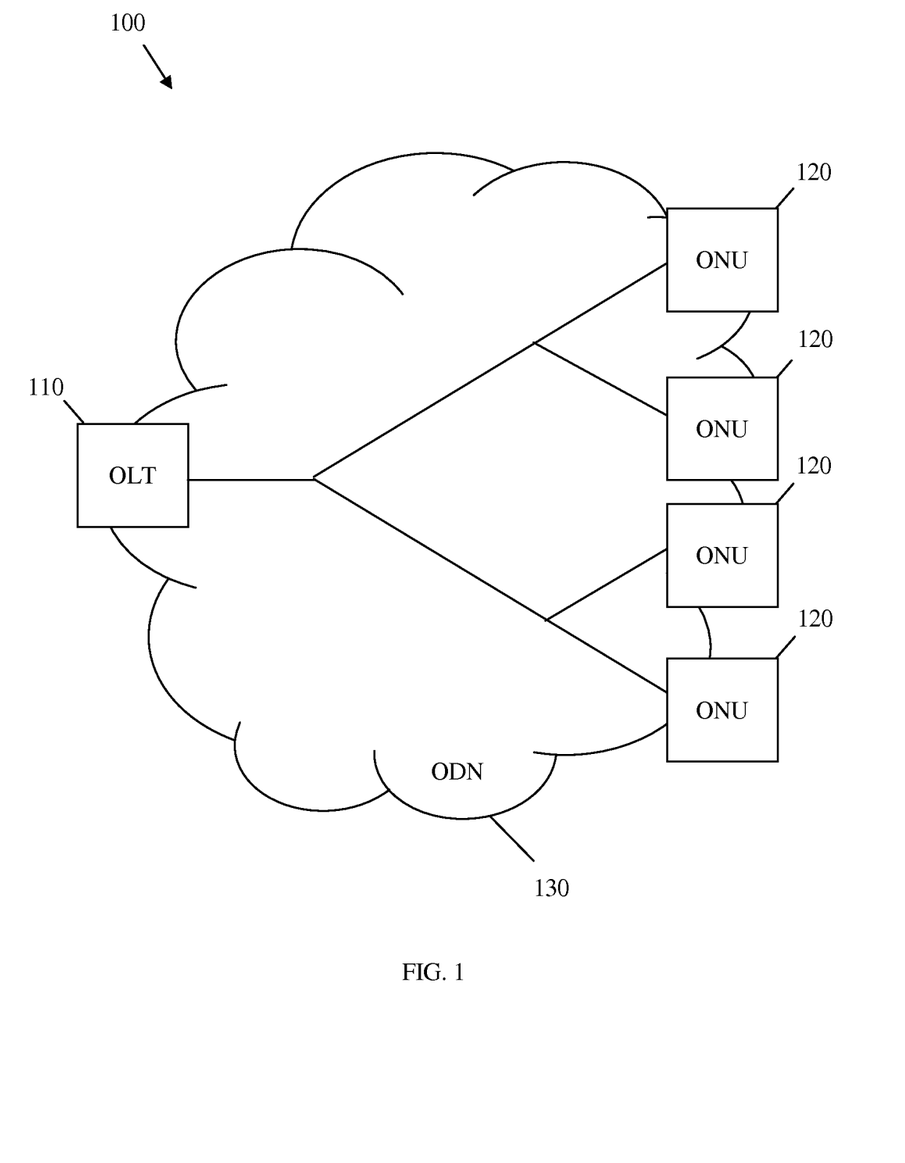
FIG. 1 is a schematic diagram of an embodiment of a PON.

FIG. 1 illustrates one embodiment of a PON 100. The PON 100 comprises an optical line terminal (OLT) 110, a plurality of optical network units (ONUs) 120, and an optical distribution network (ODN) 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. In an embodiment, the PON 100 may be a Next Generation Access (NGA) system, such as a ten gigabit per second (Gbps) GPON (XGPON), which may have a downstream bandwidth of about ten Gbps and an upstream bandwidth of at least about 2.5 Gbps. Alternatively, the PON 100 may be any Ethernet based network, such as an Ethernet PON (EPON) defined by the Institute of Electrical and Electronics Engineers (IEEE) 802.3ah standard, a ten Gigabit EPON as defined by the IEEE 802.3av standard, an asynchronous transfer mode PON (APON), a broadband PON (BPON) defined by the ITU-T G.983 standard, a GPON defined by the ITU-T G.984 standard, or a wavelength division multiplexed (WDM) PON (WPON), all of which are incorporated herein by reference as if reproduced in their entirety.

In an embodiment, the OLT 110 may be any device that is configured to communicate with the ONUs 120 and another network (not shown). Specifically, the OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONUs 120 may be any devices that are configured to communicate with the OLT 110 and a customer or user (not shown). Specifically, the ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. Additionally, the ONUs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

Another component of the PON 100 may be the ODN 130. The ODN 130 is a data distribution system that may comprise optical fiber cables, couplers, splitters, distributors, and/or other equipment. In an embodiment, the optical fiber cables, couplers, splitters, distributors, and/or other equipment are passive optical components. Specifically, the optical fiber cables, couplers, splitters, distributors, and/or other equipment may be components that do not require any power to distribute data signals between the OLT 110 and the ONUs 120. The ODN 130 typically extends from the OLT 110 to the ONUs 120 in a branching configuration as shown in FIG. 1, but may be alternatively configured in any other configuration.

In the PON 100, the downstream data may be broadcast continuously or with few interruptions from the OLT 110 to the ONUs 120. However, since the resources of the ODN 130 may be shared by multiple ONUs 120, the OLT 110 may schedule the transmission of upstream data from the ONUs 120. Typically, the OLT 110 may assign a start time and a stop time for a plurality of allocations for upstream data transmission from the ONUs 120. The OLT 110 may broadcast to the ONUs 120 a BWmap, which may comprise the start time and the stop time for each allocation. In the absence of FEC, e.g. at the ONUs 120, the payload length of each allocation may be estimated as the difference of the corresponding start time and the corresponding stop time.

Calculating the payload length using the stop time and the start time becomes more computationally complex when FEC is used at the ONUs 120. FEC is a scheme used for controlling and reducing error in data transmission, where the sender may add redundant data to the original data (or payload), which may allow the receiver to detect errors in transmission. Such error control capability may be achieved at the cost of higher bandwidth requirements for data transmission, since data may be transported using FEC frames or codewords that may comprise data blocks and additional parity blocks. Since the start time and/or the stop time indicated by the OLT 110 may not consider FEC data overhead, the start time and/or stop time may not have valid values when FEC is used in the ONUs 120. In addition, in the case of contiguous allocations, the FEC codewords may extend across the allocation boundaries. Thus, the calculation of the payload length of each allocation from the corresponding start time and the corresponding stop time may become computationally intensive.

In an embodiment, the OLT 110 may be configured to transmit the allocation payload length, instead of the stop time, to the ONUs 120. The ONUs 120 may then calculate the stop time using the payload length. Additionally, in the case of contiguous allocations, the loss of one allocation in the set of allocations may cause the loss of the entire set. To prevent the loss of the entire set of allocations, the ONUs 120 may also be configured to perform an efficient burst transmission allocation method based on information related to the allocations, as described in detail below.

Figure 2:
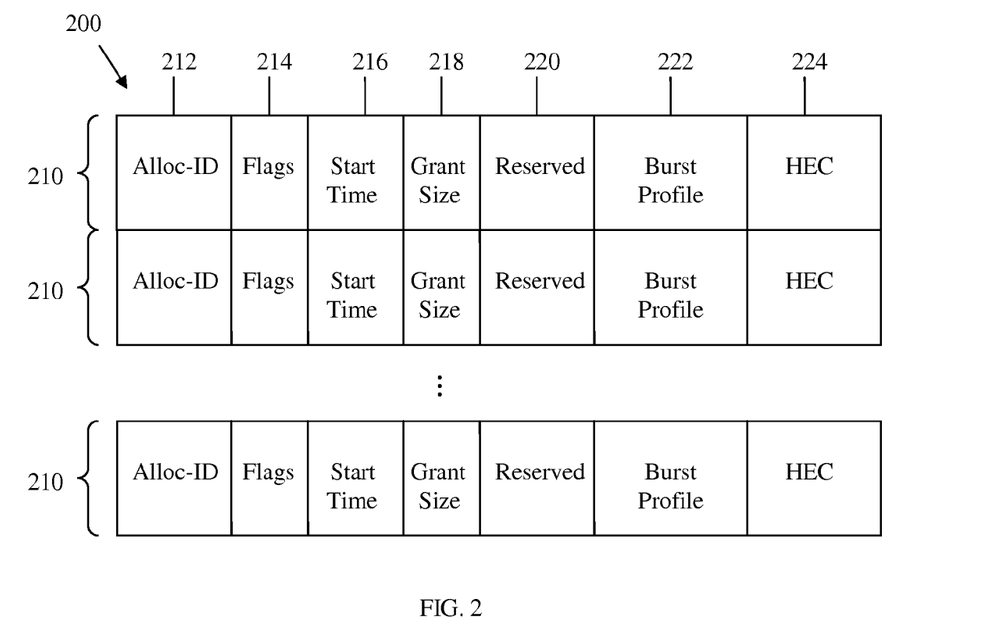
FIG. 2 is an illustration of an embodiment of a BWmap.

FIG. 2 illustrates one embodiment of a BWmap 200, which may be generated by an OLT (e.g. OLT 110) and hence received by any of the ONUs (e.g. ONU 120). The BWmap 200 may comprise one or a plurality of allocations 210, which may comprise a plurality of fields. The fields in each allocation 210 may comprise an allocation identifier (ID) 212, a flags field 214, a start time 216, a grant size 218, a reserved field 220, a burst profile (BProfile) 222, and a HEC 224, and may be arranged as shown in FIG. 2. The allocation ID 212 may indicate the recipient of the bandwidth allocation, e.g., a particular transmission container (T-CONT) or an upstream ONU management and control channel (OMCC) within an ONU. The allocation ID 212 may comprise an identifier for each allocation, which may indicate the particular ONU for which the allocation is intended. The flags field 214 may contain a plurality of flags, such as a one-bit flag for each of the physical layer operation, administration, and maintenance upstream (PLOAMu) and the dynamic bandwidth report upstream (DBRu). The start time 216 may indicate the starting time of the allocation in the upstream burst on the line after FEC and/or line encoding, which may be sent upstream from one of the ONUs to the OLT. The start time 218 may be measured in about four bytes. When a group of contiguous allocations belongs to one ONU, the first start time 218 in the first allocation may indicate the beginning of the valid data transmission of the burst. As such, the start times 216 in the subsequent allocations may be set to a predetermined value, such as 0xFFFF, to indicate that the allocations are contiguous.

The grant size 218 may indicate the length of the transmitted data from this allocation 210. The value of the grant size 218 may be equal to about the payload length before FEC and/or line coding are applied. The grant size 218 may be measured in about four bytes. The reserved field 220 may be reserved for other purposes. The BProfile 222 may indicate the burst profile of the associated upstream burst, which may comprise FEC indication and preamble indication. The HEC 224 may comprise an error correction indicator. In an embodiment, the HEC 224 may have a length equal to about 13 bits, and may be used to detect about three errors and/or correct about two errors in transmission, e.g. similar to a GPON Encapsulation Method (GEM) header. In the BWmap 200, the allocation ID 212 may have a length equal to about fourteen bits, the flags field 214 may have a length equal to about two bits, the start time 216 and the grant size 218 may each have a length equal to about two bytes, the reserved field 220 may have a length equal to about one bit, the BProfile 222 may have a length equal to about two bits, and the HEC 224 may have a length equal to about thirteen bits. Consequently, the allocation 210 may have a length equal to about eight bytes.

Figure 3:
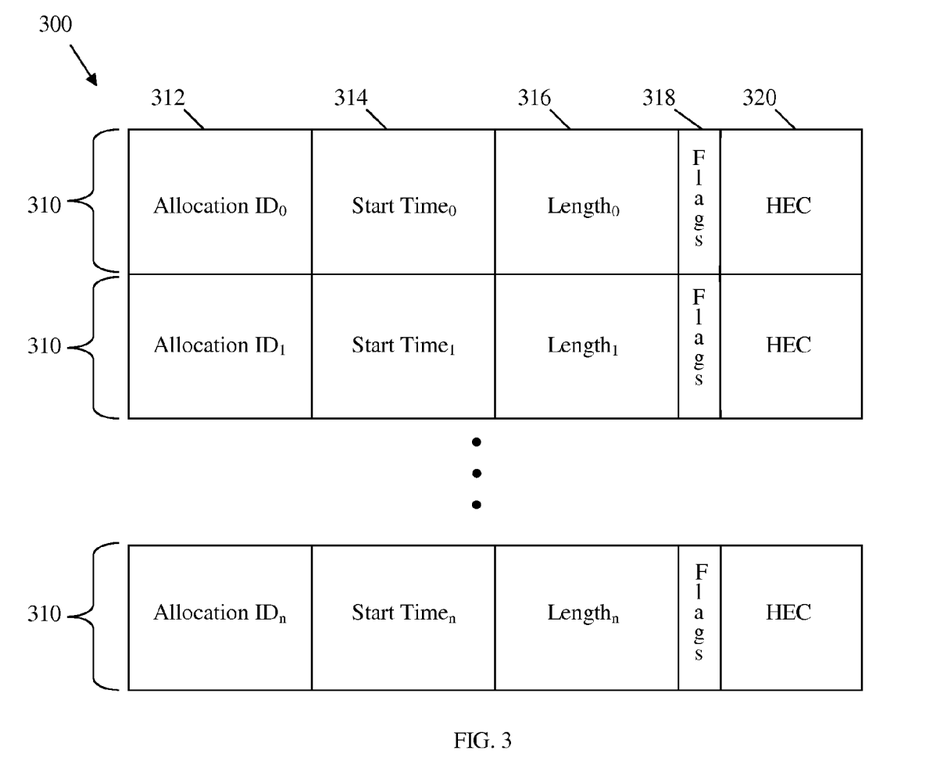
FIG. 3 is an illustration of another embodiment of a BWmap.

FIG. 3 illustrates another embodiment of a BWmap 300, which may be generated by an OLT (e.g. OLT 110) and hence received by any of the ONUs (e.g. ONU 120). The BWmap 300 may comprise a plurality of allocations 310, which may comprise a plurality of fields. The fields in each allocation 310 may comprise an allocation ID 312, a start time 314, an allocation length 316, a flags field 318, and a HEC 320, and may be arranged as shown in FIG. 3. The allocation ID 312, start time 314, allocation length 316, flags field 318, and HEC 320 may contain substantially the same information as the allocation ID 212, start time 216, grant size 218, flags field 214, and HEC 224, respectively, described above. In the BWmap 300, the allocation ID 312, the start time 314, and the length 316 may each have a length equal to about two bytes, the flags field 318 may have a length equal to about three bits, and the HEC 320 may have a length equal to about thirteen bits. Consequently, the allocation 310 may have a length equal to about eight bytes.

In an embodiment, the ONU may encode the data using FEC before sending the data frames or packets to the OLT. Before using FEC, the transmission length for each allocation may be equal to the payload length, e.g. as indicated in the BWmap. However, after using FEC, the FEC codeword that comprises the payload may have a greater length than the payload length. Typically, the transmission length is calculated from the allocation payload length, the FEC codeword payload length, and the FEC parity length. For example, the transmission length of a burst may be calculated, e.g. by an OLT and/or ONU, by:

$$\text{Transmission\_length} = \text{Payload\_length} + \text{ceiling}(\text{Payload\_length}/\text{FEC\_payload\_length}) * \text{FEC\_parity\_length}, \quad (1)$$

where Transmission_length is the transmission length based on FEC encoding, Payload_length is the allocation length e.g. as indicated by the OLT, FEC_payload_length is the maximum amount of payload that can fit in a FEC codeword, FEC_parity_length is an amount of parity of payload that can fit in the FEC codeword, and ceiling( ) indicates a function that rounds up to a nearest integer.

In the case of contiguous allocations, the FEC codeword may cross the allocation boundaries and hence the Payload_length may be the sum of the payload lengths of each of the allocations in the set of said contiguous allocations. In such case, calculating the Payload_length from the Transmission_length, e.g. using the inverse of the ceiling function in equation (1), may be difficult or undesirable. Therefore, the OLT may be configured to send the Payload_length for each allocation to the ONU using a BWmap, such as the BWmap 200 or BWmap 300. Thus, the ONU may receive the Payload_length and use it to calculate the Transmission_length, e.g. using equation (1). The ONU may then use the Transmission_length to calculate the stop time for each allocation after FEC, which may be equal to about the sum of the Transmission_length and the start time for each allocation.

Figure 4:
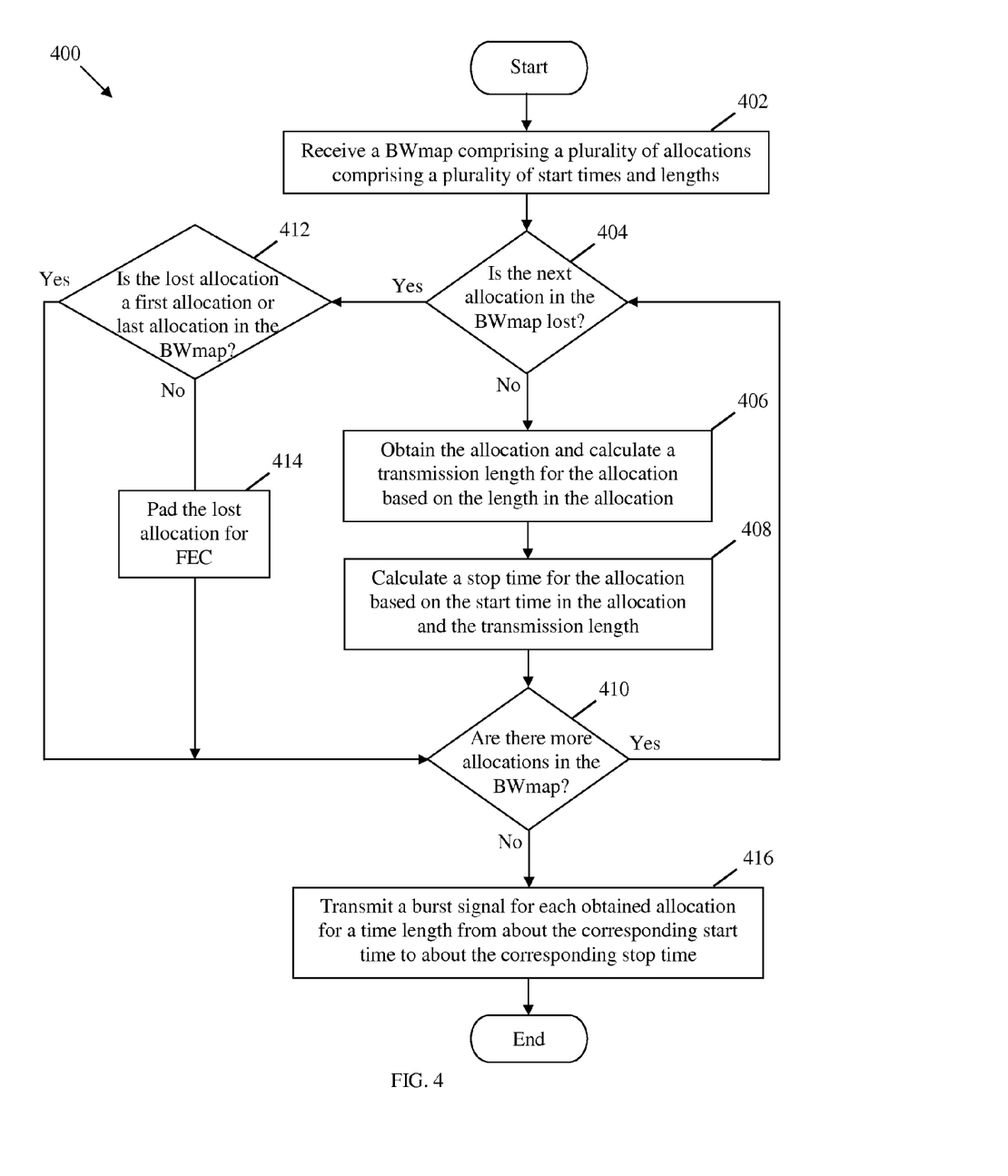
FIG. 4 is a flowchart of an embodiment of a burst transmission allocation method.

FIG. 4 illustrates one embodiment of a burst transmission allocation method 400 that may be used to allocate a plurality of burst signals, e.g. by the OLT, to at least one ONU. The burst transmission allocation method 400 may begin at block 402 where a BWmap that indicates a plurality of allocations, e.g. a plurality of allocation start times and payload lengths, may be received. For instance, an ONU may receive a BWmap (e.g. BWmap 200 or BWmap 300), which may comprise a start time (e.g. start time 216 or start time 314), an allocation length (e.g. grant size 218 or length 316), and an allocation ID (e.g. allocation ID 212 or allocation ID 312) associated with the ONU. Next, at block 404 the burst transmission allocation method 400 may verify whether the next allocation in the BWmap is lost. For example, the ONU may use the allocation ID in the BWmap to verify whether the next expected allocation is missing. The burst transmission allocation method 400 may continue to block 412 if the condition in block 404 is not met or may proceed to block 406 if the condition in block 404 is met.

At block 406, if the next allocation in the BWmap is not lost, the burst transmission allocation method 400 may obtain the allocation and calculate a transmission length for the allocation based on the allocation length. For example, that transmission length may correspond to the data length after FEC and/or line coding. The transmission length may be calculated using equation (1). Next, at block 408 the burst transmission allocation method 400 may calculate the stop time for the allocation based on the start time of the allocation and the transmission length. For instance, the stop time may be equal to about the sum of the start time and the transmission length. Next, the burst transmission allocation method 400 may proceed to block 410.

At block 412, the burst transmission allocation method 400 may verify whether the lost allocation is the first allocation or the last allocation in the BWmap. The first allocation in the BWmap may be indicated by the corresponding allocation ID. The burst transmission allocation method 400 may continue to block 410 if the condition in block 412 is met or may proceed to block 414 if the condition in block 412 is not met. At block 414, the burst transmission allocation method 400 may pad the lost allocation for FEC. For instance, during FEC coding the ONU may replace the lost allocation data with a padding sequence, e.g. a sequence of zero bits.

At block 410, the burst transmission allocation method 400 may verify whether there are more allocations in the BWmap. For example, the last allocation in the BWmap may be identified by its corresponding allocation ID. If the condition in block 410 is met, the burst transmission allocation method 400 may return to block 404. If the condition in block 410 is not met, the burst transmission allocation method 400 may proceed to block 416 to obtain and process a next allocation in the BWmap. At block 416, the burst transmission allocation method 400 may transmit a burst signal for each obtained allocation from about the corresponding start time to about the corresponding stop time obtained previously. The burst transmission allocation method 400 may then end.

Figure 5:
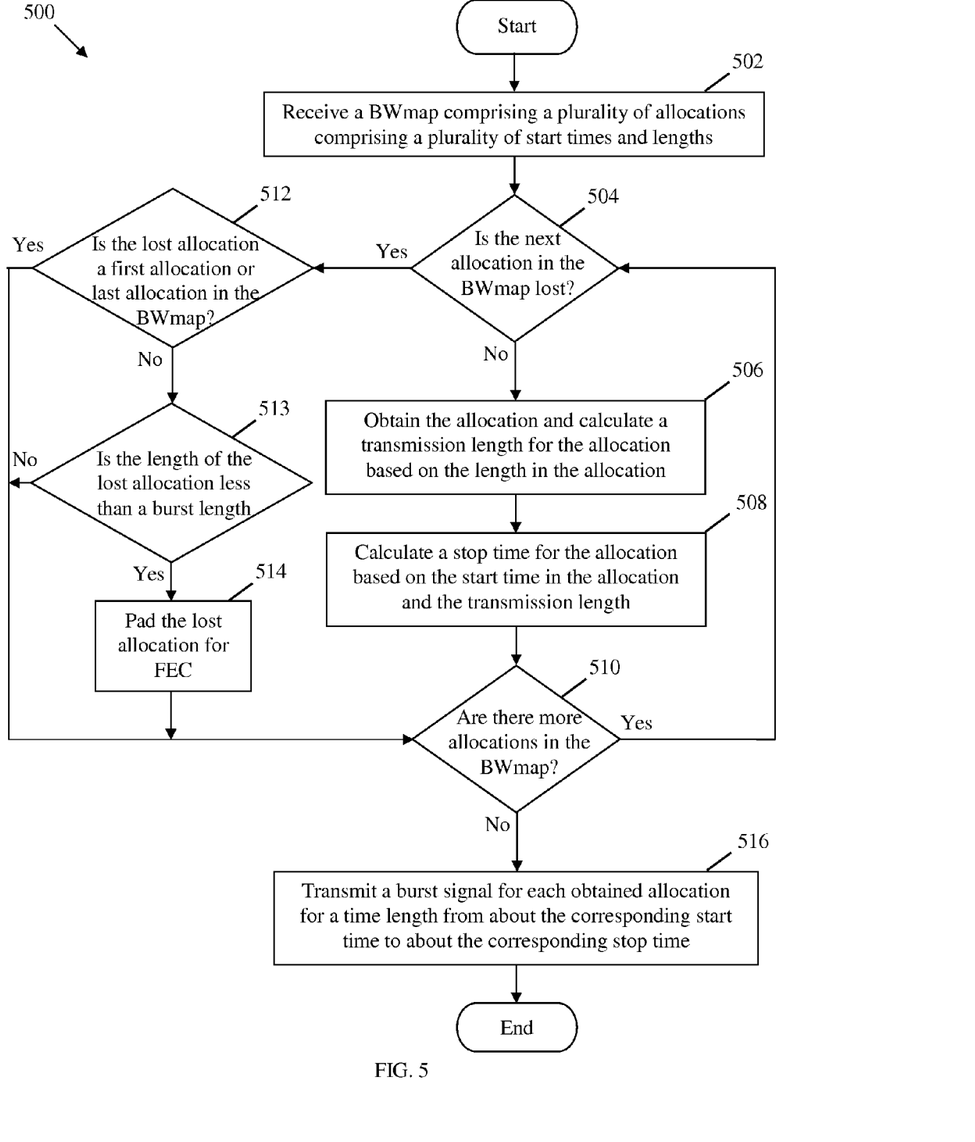
FIG. 5 is a flowchart of another embodiment of the burst transmission allocation method.

FIG. 5 illustrates another embodiment of a burst transmission allocation method 500 that may be used to allocate a plurality of burst signals, e.g. by the OLT, to at least one ONU. The burst transmission allocation method 500 may begin at block 502 where a BWmap that indicates a plurality of allocations, e.g. a plurality of allocation start times and payload lengths, may be received. For instance, an ONU may receive a BWmap (e.g. BWmap 200 or BWmap 300), which may comprise a start time (e.g. grant time 216 or start time 314), an allocation length (e.g. grant size 218 or length 316), and an allocation ID (e.g. allocation ID 212 or allocation ID 312) associated with the ONU. Next, at block 504 the burst transmission allocation method 500 may verify whether the next allocation in the BWmap is lost. For example, the ONU may use the allocation ID in the BWmap to verify whether the next expected allocation is missing. The burst transmission allocation method 500 may continue to block 512 if the condition in block 504 is not met or may proceed to block 506 if the condition in block 504 is met.

At block 506, if the next allocation in the BWmap is not lost, the burst transmission allocation method 500 may obtain the allocation and calculate a transmission length for the allocation based on the allocation length. For example, that transmission length may correspond to the data length after FEC and/or line coding. The transmission length may be calculated using equation (1). Next, at block 508 the burst transmission allocation method 500 may calculate the stop time for the allocation based on the start time of the allocation and the transmission length. For instance, the stop time may be equal to about the sum of the start time and the transmission length. Next, the burst transmission allocation method 500 may continue to block 510.

At block 512, the burst transmission allocation method 500 may verify whether the lost allocation is the first allocation or the last allocation in the BWmap. The first allocation in the BWmap may be indicated by the corresponding allocation ID. The burst transmission allocation method 500 may continue to block 510 if the condition in block 512 is met or may proceed to block 513 if the condition in block 512 is not met. At block 513, the burst transmission allocation method 500 may verify whether the length of the lost allocation is less than about a burst length. For example, if the length of the lost allocation is less than about the expected length of a burst signal, the ONU may determine that the lost allocation is assigned to it. The burst transmission allocation method 500 may continue to block 514 if the condition in block 513 is met or may proceed to block 510 if the condition in block 513 is not met. At block 514, the burst transmission allocation method 500 may pad the lost allocation for FEC. For instance, during FEC coding the ONU may replace the lost allocation data with a padding sequence, e.g. a sequence of zero bits.

At block 510, the burst transmission allocation method 500 may verify whether there are more allocations in the BWmap. For example, the lost allocation in the BWmap may be identified by its corresponding allocation ID. If the condition in block 510 is met, the burst transmission allocation method 500 may return to block 504. If the condition in block 510 is not met, the burst transmission allocation method 500 may proceed to block 516 to obtain and process a next allocation in the BWmap. At block 516, the burst transmission allocation method 500 may transmit a burst signal for each obtained allocation from about the corresponding start time to about the corresponding stop time obtained previously. The burst transmission allocation method 500 may then end.

Figure 6:
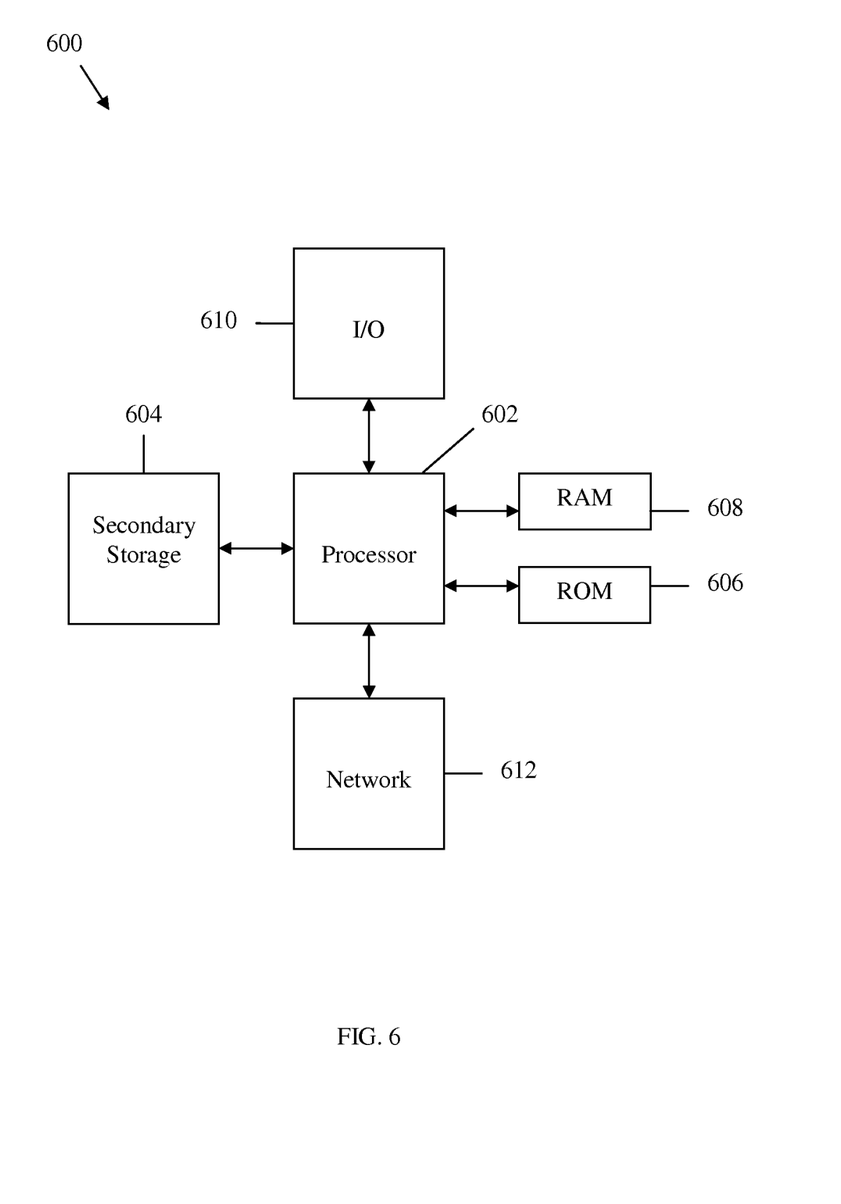
FIG. 6 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 510, and network connectivity devices 512. The processor 602 may be implemented as one or more CPU chips, or may be part of one or more application specific integrated circuits (ASICs).

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method, comprising:
    receiving a bandwidth map (BWmap) from an optical line terminal (OLT), wherein the BWmap comprises a plurality of allocations for a plurality of burst signals; and
    transmitting at least one of the burst signals to the OLT in response to the BWmap,
    wherein each allocation comprises a start time for the allocation, a grant size for the allocation, and a header error correction (HEC) for the allocation, and
    wherein the start time and the grant size are both measured in four bytes.

2. The method of claim 1, wherein the HEC is used for correcting about two errors and detecting about three errors, and wherein a size of the HEC is equal to about thirteen bits.

3. The method of claim 1, wherein a group of contiguous allocations belongs to one optical network unit (ONU), the beginning of the group of contiguous allocations is indicated by the start time in the first allocation of the group of contiguous allocations, and wherein the start times in subsequent allocations of the group of contiguous allocations are set to a predetermined value to indicate that the allocations are contiguous.

4. The method of claim 1, wherein each allocation further comprises a flags field, and wherein the flags field is a two-bit field consisting of a first one-bit indicator for a dynamic bandwidth report upstream (DBRu) and a second one-bit indicator for a physical layer operation, administration, and maintenance upstream (PLOAMu).

5. The method of claim 4, wherein each allocation further comprises a burst profile, wherein the burst profile is a two-bit field that comprises a preamble indication.

6. The method of claim 4, wherein each allocation further comprises a burst profile, and wherein the burst profile is a two-bit field that comprises a Forward Error Correction (FEC) indication.

7. An apparatus, comprising:
    a receiver configured to receive a bandwidth map (BWmap) from an optical line terminal (OLT), wherein the BWmap comprises a plurality of allocations for a plurality of burst signals; and
    a transmitter configured to transmit at least one of the burst signals to the OLT in response to the BWmap,
    wherein each allocation comprises a start time for the allocation, a grant size for the allocation and a header error correction (HEC) for the allocation, and
    wherein the start time and the grant size are both measured in four bytes.

8. The apparatus of claim 7, wherein the HEC is used for correcting about two errors and detecting about three errors, and wherein a size of the HEC is equal to about thirteen bits.

9. The apparatus of claim 7, wherein a group of contiguous allocations belongs to one optical network unit (ONU), the beginning of the group of contiguous allocations is indicated by the start time in the first allocation of the group of contiguous allocations, and wherein the start times in subsequent allocations of the group of contiguous allocations are set to a predetermined value to indicate that the allocations are contiguous.

10. The apparatus of claim 7, wherein each allocation further comprises a flags field, and wherein the flags field is a two-bit field consisting of a first one-bit indicator for a dynamic bandwidth report upstream (DBRu) and a second one-bit indicator for a physical layer operation, administration, and maintenance upstream (PLOAMu).

11. The apparatus of claim 10, wherein each allocation further comprises a burst profile, wherein the burst profile is a two-bit field that comprises a preamble indication.

12. The apparatus of claim 10, wherein each allocation further comprises a burst profile, wherein the burst profile is a two-bit field that comprises a Forward Error Correction (FEC) indication.

13. An apparatus, comprising:
    an optical network unit (ONU) configured to receive a downstream frame comprising a bandwidth map (BWmap) from an optical line terminal (OLT) and to transmit a corresponding burst signal to the OLT in response to the BWmap,
    wherein the BWmap comprises a plurality of allocations for a plurality of burst signals to be transmitted by a plurality of optical network units (ONUs),
    wherein each allocation comprises a start time for the allocation, a grant size for the allocation and a header error correction (HEC) for the allocation, and wherein the start time and the grant size are both measured in four bytes.

14. The apparatus of claim 13, wherein the HEC is used for correcting about two errors and detecting about three errors, and wherein a size of the HEC is equal to about thirteen bits.

15. The apparatus of claim 13, wherein a group of contiguous allocations belongs to the ONU, the beginning of the group of contiguous allocations is indicated by the start time in the first allocation of the group of contiguous allocations, and wherein the start times in subsequent allocations of the group of contiguous allocations are set to a predetermined value to indicate that the allocations are contiguous.

16. The apparatus of claim 13, wherein each allocation further comprises a flags field, and wherein the flags field is a two-bit field consisting of a first one-bit indicator for a dynamic bandwidth report upstream (DBRu) and a second one-bit indicator for a physical layer operation, administration, and maintenance upstream (PLOAMu).

17. The apparatus of claim 16, wherein each allocation further comprises a burst profile, wherein the burst profile is a two-bit field that comprises a preamble indication.

18. The apparatus of claim 16, wherein each allocation further comprises a burst profile, wherein the burst profile is a two-bit field that comprises a Forward Error Correction (FEC) indication.

* * * * *